United States Patent Office.

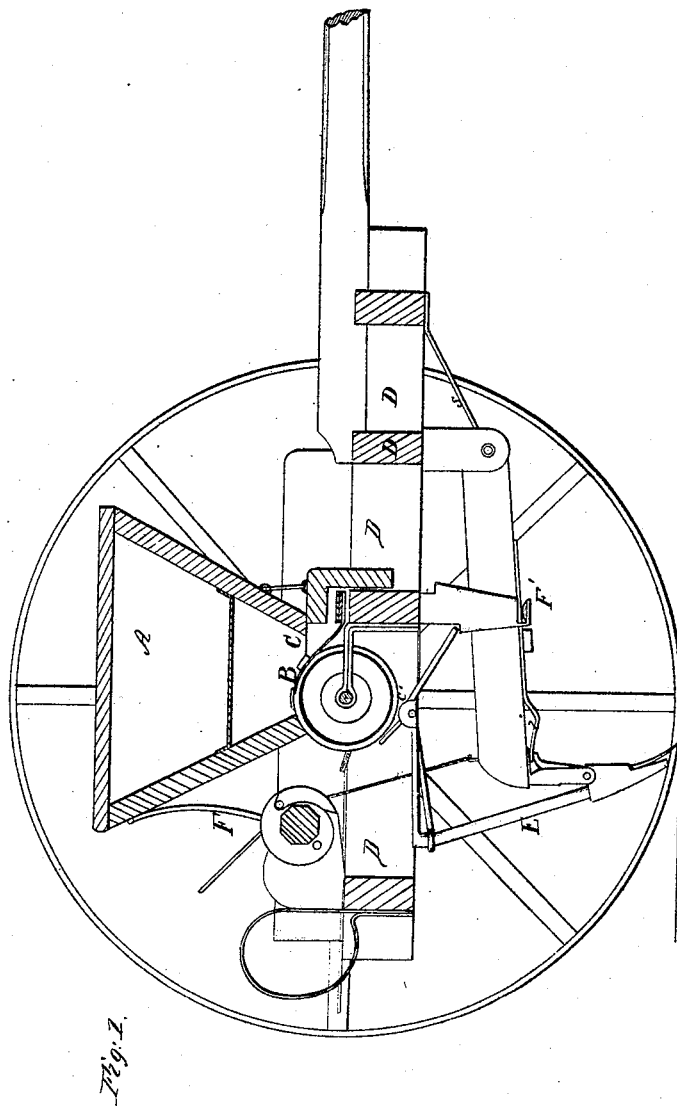

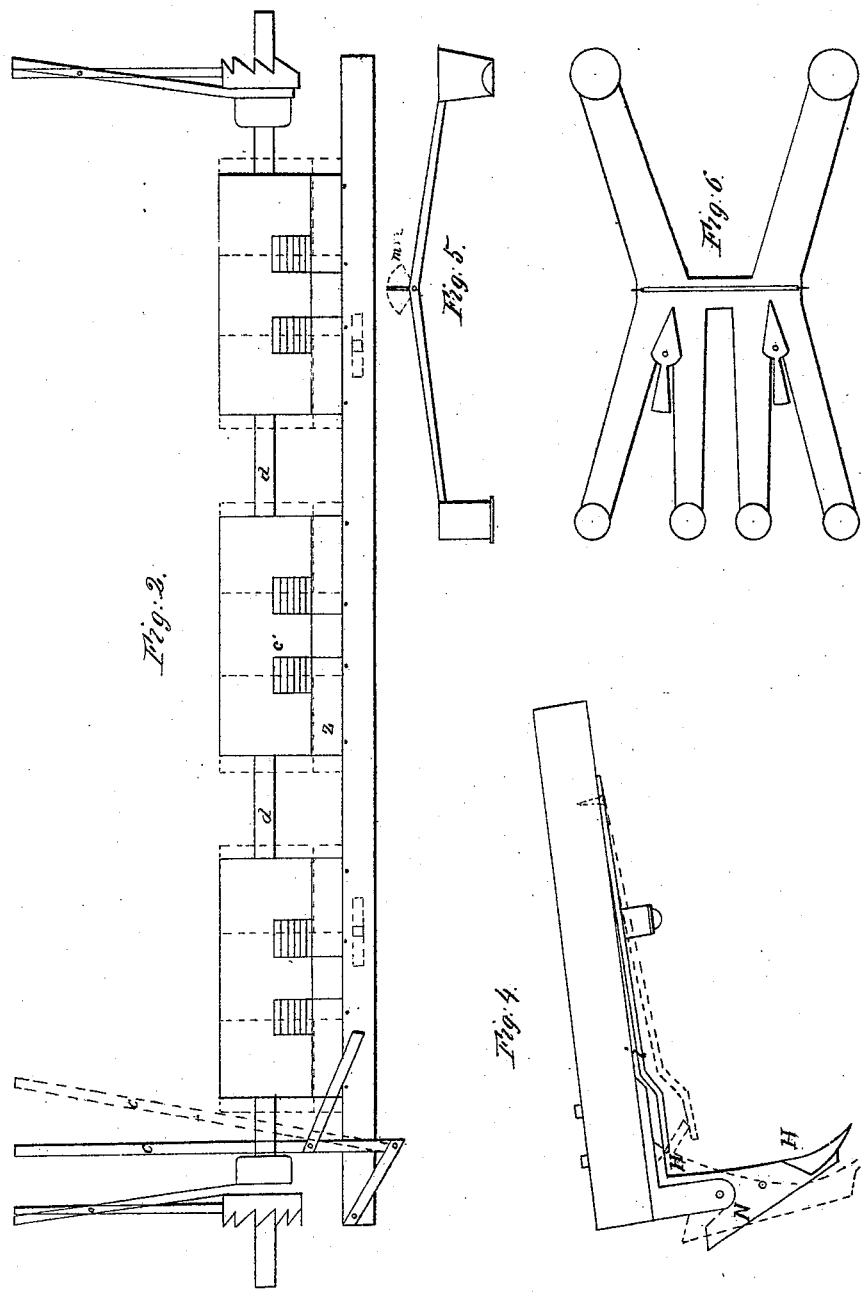

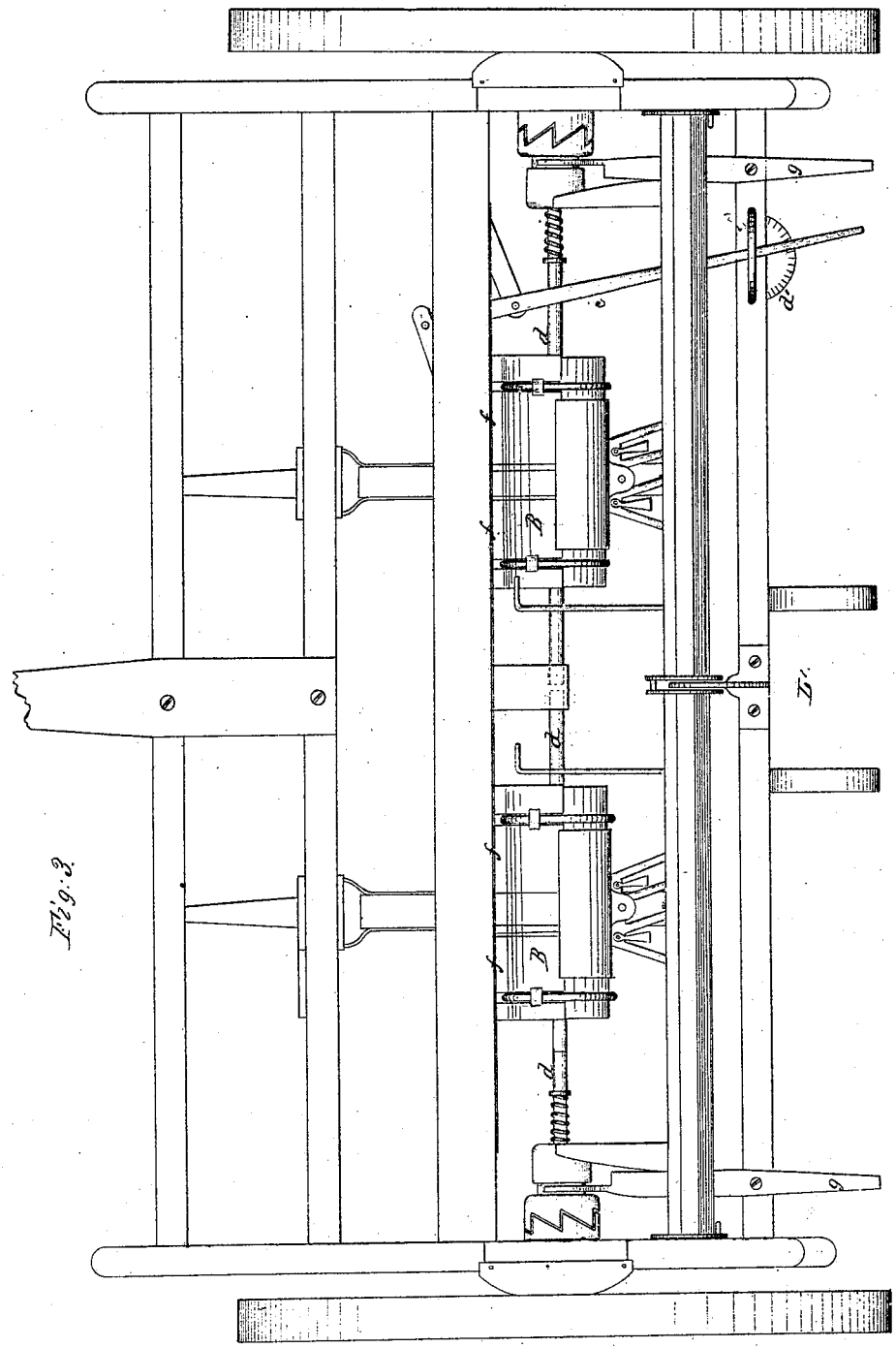

GILES A. TITUS, OF MANTORVILLE, ASSIGNOR TO HIMSELF AND SAMUEL B. PINNEY, OF ST. CLOUD, MINNESOTA.

Letters Patent No. 92,903, dated July 20, 1869.

---

IMPROVEMENT IN MACHINE FOR SOWING AND DRILLING GRAIN.

---

The Schedule referred to in these Letters Patent and making part of the same.

---

*To all whom it may concern:*

Be it known that I, GILES A. TITUS, of the town of Mantorville, in the county of Dodge, and State of Minnesota, have invented new and useful Improvements in Machines for Sowing and Drilling Grain; and I do hereby declare that the following is a full, clear, and exact description thereof, reference being had to the accompanying drawing, making part of this specification, and to the letters of reference marked thereon, in which—

Figure 1 is a vertical section, taken in the line of *x x*, fig. 3.

Figure 2 is a view of the seed-rollers detached.

Figure 3, a plan or top view of the machine.

Figure 4, a section of one of the drill-tubes attached to the furrowing-device.

Figure 5, a side view of the grain-conductor, showing the device for changing from drilling to broadcast-sowing, and *vice versa*.

Figure 6, a top view of the grain-conductor, with the device for attaching the drill-tubes, broadcast-scatterer, and the regulators to equal the even distribution of grain flowing to the drill tubes.

A represents the seed-hopper, which is of a triangular shape in its cross-section, as is shown in fig. 1, and is mounted upon two wheels in the usual manner.

Upon the frame D, in front of and at the bottom of hopper A, is arranged a series of feed-rollers B, mounted upon a shaft, *d*, which shaft is in line with the axle of the machine, and which are driven by ratchets on each hub, which are a part of the wheels of the machine, extended to receive said shafts, as is clearly shown in fig. 3.

These feed-rollers B, (see fig. 2,) are made double, and each end is made of two parts, one consisting of a series of radial buckets, the other being a head or drum, with openings in the end next to the buckets, fitted to slide between said buckets, one part of which is secured rigidly to shaft *d*, while the other part is kept in its place by the sliding cap, which said sliding cap is secured rigidly to slides, as clearly shown in fig. 2, by means of the lever *c*. The parts 3, which the sliding caps are attached to, may be moved to the right and left, and thereby enlarge the size of the buckets, and by these means the quantity of grain sown may be regulated as desired.

To indicate the quantity sown, a plate, D, is placed underneath the lever *c*, which plate, *d'*, has marks upon it, indicating the number of bushels sown per acre. (See fig. 3.)

At the bottom of hopper A, directly in the rear of each feed-roller B, an opening is made, through which the grain flows into the buckets of B, which carry said grain downward and forward, delivering it out of the openings C', in frame D, there being one of said openings or passages at each end of roller B, as clearly shown in fig. 3.

Directly underneath each opening or passage, the grain-conductor is hung or attached, with its devices, and at the rear end of said grain-conductor the seed-tubes E are attached, which pass downward into the receiver that is securely attached to the rear part of the cultivator or furrow-opener, and at the front end of said conductor, a broadcast-scatterer, F', is attached to the frame D in such a way as to receive the grain from said conductor, all of which is clearly shown in fig. 1.

Whenever it is desired to change from drilling to broadcast-sowing, or *vice versa*, turn the device *m*, in the centre of said grain-conductor, to the front or rear, as shown in fig. 5.

In front of said tube E, and the opening C, the cultivators or furrow-openers are attached to the ends of the drag-bars, the front ends of which are attached to a rod passing longitudinally underneath the frame D, and to which they are also secured by brace, S. (See fig. 1.)

These furrow-openers are pivoted, and their front ends are shod with metal, the upper end of H being pressed back by the spring *i*, which said spring *i* is also secured by bolts, one of which passes through a rubber roll, and is securely attached to the drag-bars of the machine, as clearly shown in fig. 4.

At the rear end of the drag-bar, a chain is attached, passing upward, the upper end of which is attached to rollers or lifters L, which said rollers or lifters are hung on an eccentric on the top and rear end of frame D, and operated by means of levers F, separately or together, as clearly shown in fig. 1.

The levers *g*, at each end of the machine, connect with and operate the sliding part of the ratchet on shaft *d*, which throws the said ratchet in and out of gear, at the pleasure of the operator, as indicated in fig. 2, the sliding part of the ratchet being held in its place, and in gear, by means of a spiral-spring wire around shaft *d*.

A driver's seat, L', may be located and attached to the rear, and to the frame D, between the levers *f*, as shown in fig. 3, from which position, with his feet resting upon said frame D, the driver can readily reach and operate the levers *c*, *f*, and *g*.

The operation is as follows:

The grain to be sown is placed in hopper A, the ratchet on shaft D is thrown into the ratchet forming a part of the hub of the wheels of the machine, by means of lever *g*, and the former held in its place by the spiral-wire spring, and the machine moved forward. The grain flows through the openings into the lower front side of the hopper, into the buckets of B, which, as they rotate forward, deliver it into the openings C, from whence it passes to the grain-conductor, and from thence down into the open ends of the grain-tubes E, and flows thence down along said tubes into the drill-furrow prepared for it by furrow-openers, H.

In order to change sowing grain to broadcast, instead of in drills, turn the device m, in the centre of said grain-conductor, to the rear, and then the grain will flow along and downward on said conductor into the broadcast-scatterer F, which evenly distributes the grain over the ground in front of the furrow-openers H.

Having thus described my invention, and its construction and operation,

What I claim, and desire to secure by Letters Patent, is—

1. The double feed-rollers B, triangular cup or bucket, in combination with the triangular hopper A and openings C, when constructed and operating as described.

2. The drill-tubes, and the method herein described for attaching the tube-receiver N to furrow-opener H, when constructed and operating as described.

3. In combination with the tubes N, the pivoted furrow-opener H and spring i, when secured by a bolt passing through a rubber roll.

4. The grain-conductor and the device m, for changing from drilling to broadcast-sowing, and *vice versa*, when constructed and operating as described.

5. The double lever used to regulate the amount of grain sown per acre, when constructed and operating as described.

6. In connection with two draught-wheels, the solid hub cast with a journal upon the inner end or side thereof, having the bearings upon the frame of the machine, and terminating in the clutch on the end of the journals, and fitted to receive the clutch and the rod upon which the feed-rollers B are rigidly attached.

7. The construction, arrangement, and operation of the rollers L, separately and together, in raising the drag-bars of the machine, when constructed and operating as described.

GILES A. TITUS.

Witnesses:
M. E. TITUS,
EDWARD STICKLE.